July 10, 1934.　　　　C. D. LAKE　　　　1,965,981
PRINTING CONTROL MECHANISM
Filed Dec. 19, 1932　　　2 Sheets-Sheet 2
FIG.2.
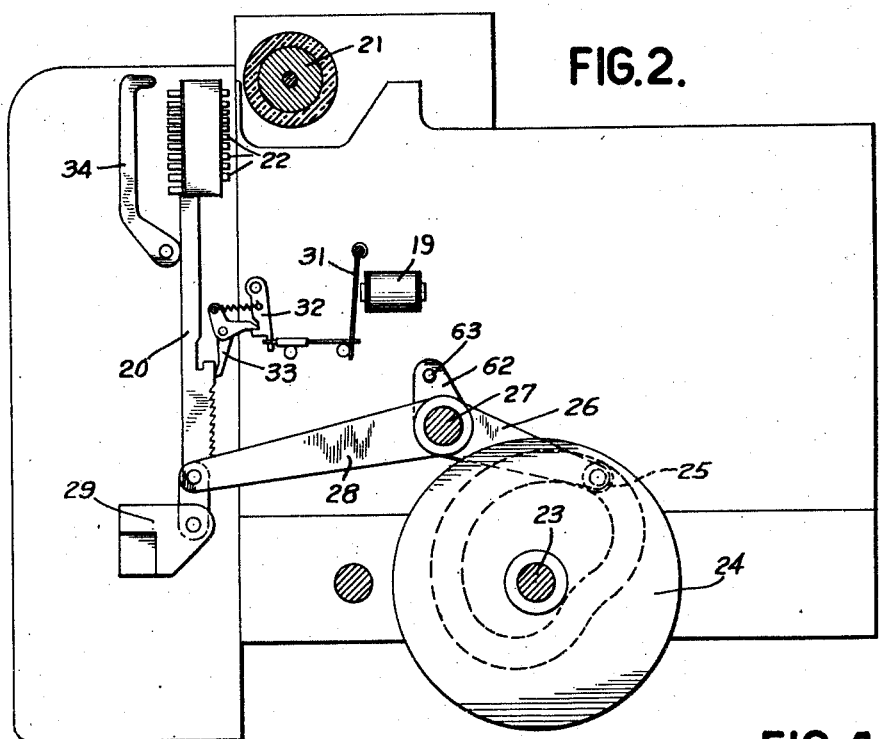
FIG.3.
FIG.4.
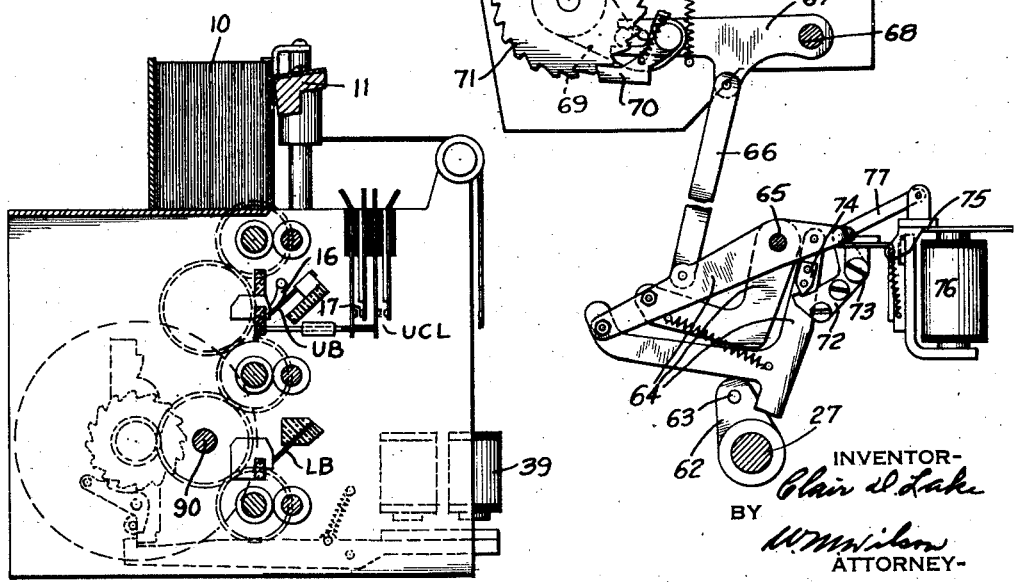
INVENTOR-
Clair D. Lake
BY
W. M. Wilson
ATTORNEY- Patented July 10, 1934

1,965,981

UNITED STATES PATENT OFFICE 1,965,981

PRINTING CONTROL MECHANISM

Clair D. Lake, Binghamton, N. Y., assignor, by mesne assignments, to International Business Machines Corporation, New York, N. Y., a corporation of New York Application December 19, 1932, Serial No. 647,916

6 Claims. (Cl. 101—93)

This invention relates to record controlled machines employed in compiling accounting and statistical data.

Such machines are usually controlled by suitably perforated record cards wherein the perforations represent both numerical and classification data. Illustrations of the form which such a machine may take are described in detail in United States Letters Patent Nos. 1,762,145 and 1,757,123. The machines described in said patents operate according to the well known Hollerith system and are used extensively for accounting and statistical purposes.

According to the usual practices in the art of compiling accounting and statistical data by means of perforated cards, the latter are perforated with the data on invoices, bills, notes, memoranda, or other papers and are then sorted in a sorting machine to place the record cards in some preconceived order which depends upon the nature of the accounting and statistical data desired. The tabulating machine is usually provided with what is known in the art as an "automatic group control unit" which is designed to sense changes in the group num ers and cause the machine to automatically take a total of the items accumulated by the group of item cards which passed through the machine prior to the initiation of the total taking cycle.

It is often desired to secure a printed list of all the cards bearing a certain classification or code number without the necessity of pre-sorting the cards to eliminate all but the desired cards so that the latter occur in a single group. This situation often arises where the record cards are always filed according to a given classification system and for convenience of reference must always be refiled in accordance with such system, requiring that the cards be first sorted into a group according to a different classification and then, after the printing of data of the individual group or groups has been completed, re-sorted to restore the cards to their original order in the files.

Where the number of cards is large, sorting operations necessary to eliminate all but a certain class or group for the purpose of tabulating a single group classified differently from the file classification is often time consuming and wasteful. This is particularly true where the new classification may form a new grouping wherein the cards to be tabulated as a single group include a major share of the total number of cards.

The present invention, therefore, has for its object to provide accounting and statistical machines controlled by records with means for suppressing the printing of all record cards except cards of a predetermined classification or vice versa.

A more specific object is to provide a presettable selecting device, settable in accordance with classification data whereby only cards bearing such data will control printing operations.

A further object is to provide novel paper spacing control mechanism coordinated with the presettable selecting device to permit paper spacing only in response to printing operations.

Various other objects and advantages of the invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 2 is a view showing the printing mechanism of such a machine.

Fig. 3 is a detail of the record feeding and analyzing mechanism.

Fig. 4 is a detail of the paper spacing control mechanism.

Figure 1:
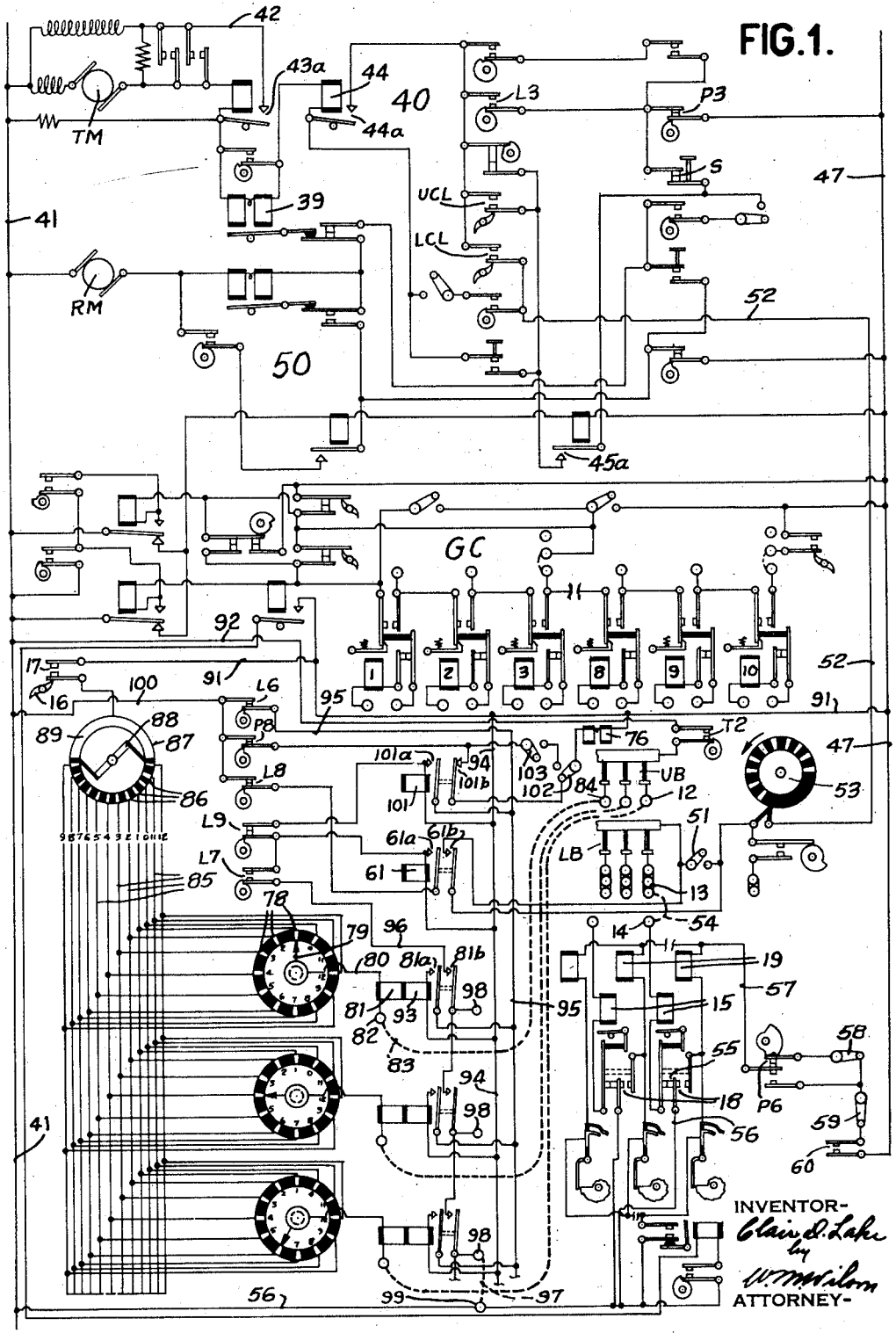
Fig. 1 is a wiring diagram of the electric circuits of a tabulating machine to which the device is applicable.

The present invention will be described as embodied in a machine of the type illustrated and described in the above mentioned patents with particular reference to No. 1,762,145. The general details of construction of the machine are well known in the art and described in said patent, consequently there will be given herein only a brief explanation of such parts thereof as are necessary to an understanding of the present invention. It will be helpful in understanding the invention described herein if it be noted that cam contacts identified by the letter L followed by a numeral on the circuit diagram are operated by the tabulating mechanism through the power of the motor TM (Fig. 1) operative during listing operations, while cam contacts identified by the letter P followed by a numeral are operated by the resetting and total taking mechanism through the power of the motor RM.

Referring to Figs. 1 and 3, the record cards are successively fed from a stack 10, one at a time, by means of a picker 11 into engagement with the usual feed rollers which advance them to the usual discharge stack. The cards are advanced past the upper analyzing brushes UB and exactly one machine cycle later past the lower analyzing brushes LB. Suitable wires connect these brushes to a plugboard (not shown) terminating in sockets 12 and 13 respectively. The plugboard also includes sockets 14 which are connected to the counter magnets 15.

As the perforated cards pass the upper brushes, a card lever 16 is engaged by the cards to cause closure of card lever contacts 17 and hold them closed as long as cards continue to feed past the upper brushes.

As the cards pass the lower brushes their index points instantaneously close circuits through the proper lower analyzing brushes LB to energize counter magnets 15. As usual the timed energization of these magnets control mechanism for entering data corresponding to the card reading on the counter wheels. When any magnet 15 is energized, it causes contacts 18 to close, energizing a printer magnet 19 to select the type corresponding to the entered data for printing. In this fashion the accumulated or entered items may be listed.

In Fig. 2 is shown the printing mechanism through which the type bar 20 is positioned relatively to the platen 21 to bring the proper type 22 opposite the platen. The listing shaft 23 driven by the tabulating motor TM is provided with a cam 24 cooperating with a roller 25 carried by an arm 26 operatively connected to a shaft 27. As the cam rotates, shaft 27 is rocked in a clockwise direction and an arm 28 secured thereto and linked at its free end to printing crosshead 29 serves to raise the type bars 20 in synchronism with the movement of the record cards past the analyzing brushes so that the type 22 successively pass printing position opposite platen 21. The type bar 20 is arrested under control of printing magnet 19 which, when energized, attracts its armature 31 and through a call wire releases latch member 32, normally holding stop pawl 33. When the pawl is so released, it is spring operated to engage the ratchet teeth formed on the type bar 20 to prevent further upward movement of the type bar, thus holding a particular type 22 in printing position. The usual hammers 34 are provided to impel the type against the platen.

During tabulating and listing operations the machine is driven by the motor TM (Fig. 1) controlled by a group of relays and contacts generally designated 40. The circuit which serves to maintain the motor TM in operation is as follows: From left side of line 41 through motor TM, wire 42, motor relay, points 43a, (now closed), clutch magnet 39, start relay 44, its points 44a, also closed, upper card lever contacts UCL, automatic control relay points 45a, stop key contacts S, contact P3, to right side of line 47. This circuit is the usual one for maintaining the motor TM in operation as long as cards continue to feed through the machine to hold contacts UCL closed.

During total taking operations the machine is driven by a reset motor RM controlled by a group of circuits, contacts and relays designated generally at 50. By means of a group control mechanism, indicated generally at GC, groups of cards, as represented by the same data entry in certain selected columns may be operated upon separately, the items of each group being accumulated and the total of them taken before the machine begins operation on the following card group.

With the machine adjusted for listing data from each card passing the brushes a switch 51 (Fig. 1) is normally closed and the following circuits completed through the lower brushes: From line 47, contacts P3, L3, LCL, wire 52, impulse distributor 53, switch 51, perforation in the card, brush LB, socket 13, connection 54, socket 14, magnet 15, contacts 55, wire 56 to left side of line 41. Energization of magnet 15 will cause opening of contacts 55 to interrupt this circuit and closure of contacts 18 to complete the printing circuit from line 41, wire 56, contacts 18, print magnet 19, wire 57, contacts P6, switches 58, 59, contacts 60, closed during listing operations, to line 47. During normal operations this circuit is completed for each card.

For the purposes of the present invention, switch 51 is opened and relay contact points 61b are provided, which bridge switch 51 to permit completion of the printing circuit for only those cards which correspond to the setting of the selector device. The manner of controlling contacts 61b will be explained hereinafter.

Referring now to Fig. 4, the shaft 27 which rocks each listing cycle carries an arm 62 having a pin 63 adapted to rock a structure 64 pivoted at 65 which in turn is connected by a link 66 to an arm 67 pivoted at 68 and having a bifurcated end cooperating with a pin in an arm 69 pivoted on the axle rod of the printing platen. Arm 69 carries a pawl 70 which cooperates with a ratchet 71 secured to the platen.

By virtue of the connection just traced, paper spacing is effected after each printing operation or cycle, the clockwise rocking of shaft 27 serving to lower pawl 70 and advance ratchet 71 during the upstroke of the type bars and the return counterclockwise rocking of the shaft serving to raise the pawl.

For the purposes of the present invention means are provided to suppress paper spacing operations during cycles in which no printing is effected. This means includes a latch 72 pivoted at 73 and adapted to cooperate with a block 74 integral with structure 64. When the structure 64 is rocked in a counterclockwise direction, it is held by latch 72, permitting arm 62 to return without accompaniment by the structure 64. A magnet 76 whose armature 75 has link connection 77 with latch 72 will, when deenergized, release the latch to permit the paper spacing mechanism to function under control of the selector device in a manner to be described.

Referring now to Fig. 1, the selector device comprises a number of dial switches including segments 78 and manually positionable contactors 79. Three such dial switches have been shown diagrammatically and their contactors set to the number 146. With this setting only data from cards which have the classification number 146 will control printing operations and all other cards will pass through the machine without effecting printing operations.

Contactor 79 is connected by a wire 80 to a coil 81 of a double wound magnet. The coil 81 terminates at its other end in a socket 82 which may be connected by a suitable plug connection 83 with socket 84 of the upper brush UB which traverses a column of the record card in which the classification data is punched. Segments 78 of which there are twelve, corresponding to the twelve index point positions of the record card, are electrically connected to a group of wires 85, leading to twelve segments 86 of an impulse emitter 87.

A double brush 88 successively connects the segments 86 to a collector strip 89 which is connected to line 47 through upper card lever contacts 17. Brush 88 may be carried by a shaft such as shaft 90 of Fig. 3 which makes one revolution for each card feeding cycle and contacts with the segments 86 as the corresponding index point positions of the card are sensed by the upper analyzing brushes UB.

When a card bearing classification punching is in agreement with the setting of the dial switches, the related coils 81 are energized at differential times depending upon the location of the perforations. In the example under consideration, namely 146, the uppermost coil 81 will be energized at the "1" time in the cycle, the center coil at the "4" time and the lowermost coil at the "6" time, through parallel circuits traceable for the upper coil 81 as follows: From line 47, wire 91, contacts 17, collector strip 89, brushes 88, "1" segment 86, "1" wire 85, "1" segment 78 of the upper dial switch, contactor 79, wire 80, coil 81, socket 82, connection 83, socket 84, upper brush UB, perforation in the "1" index point position, contacts T2, wire 92 to line 41. Coil 81 causes closure of points 81a and 81b, the former setting up a circuit through the second winding 93 to keep both points closed, as follows: From line 47, wire 91, wire 94, coil 93, points 81a, wire 95 contacts L6 to line 41. Each coil 81 will thus be energized in turn and its points 81a and 81b held closed until shortly before the next card is analyzed by the upper brushes at the time contacts L6 open momentarily, to drop the holding circuit.

Inspection of Fig. 1 will disclose that the several contacts 81b are connected in series terminating in a wire 96 at the upper end and in a plug connection 97 at the lower end. Each pair of contacts 81b is provided with a plug socket 98 adapted for connection to plug 99 by connection 97 so that any number of contacts 81b may be included in the series circuit between wire 96 and connection 97. In the present example of three digits, the connection 97 is made as shown, whereas if the classification number were a single digit connection 97 would extend from plug socket 99 to the uppermost socket 98.

After the last index point position has been analyzed by the upper brushes, the series circuit is completed by closure of cam contacts L7 as follows: From line 41, wire 56, socket 99, connection 97, socket 98, serially through contacts 81b, wire 96, contacts L7, magnet 61, wires 94, 91, to line 47. Magnet 61 closes its points 61a to set up a holding circuit from line 41, wire 100, contacts L8, points 61a, magnet 61 to line 47 as before. This circuit will be maintained by contacts L8 until all the index point positions of the card which are to control printing, have passed the lower brushes. Since contact points 61b are also held closed for this same period, current will be supplied to the lower brushes so that data may be read from the card whose classification data agreed with the data set on the selector device.

Concurrently with the completion of the circuit through magnet 61, a parallel circuit is also established which branches at contacts L7 and continues through contacts L9, magnet 101, wires 94, 96 to line 47. Magnet 101 closes its points 101a and opens points 101b, the former setting up a holding circuit from line 47, wires 91, 94, magnet 101, points 101a, wire 95, contacts L6 to line 41. Contacts 101b normally complete a circuit from line 41, wire 100, contacts P8, contacts 101b, switch 102, magnet 76, wire 91, to line 47. This energization of magnet 76 as explained in connection with Fig. 4 prevents paper spacing, so that when contacts 101b open, deenergizing magnet 76, such spacing may be effected following a printing action. In this manner paper spacing is effected only when there is agreement between the setting of the selector device and the classification data of the record card.

When the machine is operated independently of control by the selector device, switch 102 is rocked to its second position and switch 103 is closed. Under such conditions, spacing is suppressed except during total taking operations when contacts P8 open to permit deenergization of magent 76.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is as follows:

1. In a printing machine, a dial switch having a plurality of contact segments, corresponding to index point positions of a record card, a contactor settable to select one of said segments, means for analyzing the index point positions of a record card, printing mechanism, a circuit adapted to be completed through said selected segment and a perforation in the corresponding index point position of the record card and means controlled by said circuit for rendering said printing mechanism effective for control by data on said record card.

2. In a printing machine, a dial switch having a plurality of contact segments corresponding to index point positions of a record card, a contactor settable to select one of said segments, means for analyzing the index point positions of a record card, printing mechanism and paper spacing mechanism, a circuit adapted to be completed through said selected segment and a perforation in the corresponding index point position of the record card and means controlled by said circuit for rendering said printing and paper spacing mechanisms effective for control by data on said record card.

3. In a printing machine, means for comparing data on a record card with settable data comprising manually settable dial switches, means for emitting a series of differentially timed electrical impulses to said switches, said switches being adapted to select impulses from said series to complete circuits through perforations in a record card, printing mechanism and means controlled by said circuits for controlling the operation of said printing mechanism.

4. In a printing machine, a plurality of means for analyzing a plurality of fields of a record card in succession, means for comparing data analyzed by one of said analyzing means including manually settable dial switches, and an emitter for sending a series of electrical impulses to said switch, said switch being adapted to select one of said impulses for cooperation with said first named analyzing means and means controlled by said selected impulse for controlling the operation of said other analyzing means.

5. In a record controlled printing machine including a plurality of card reading devices, one acting after the other upon the same card, means for successively reading the index point positions of the record card, means for emitting a series of impulses timed in their emission with the point by point reading of the card, a settable switch for selecting one of said impulses, a circuit completed under control of the first analyzing means when a perforation occurs in an index point corresponding to the selected impulse and means controlled by said circuit for controlling the other card reading devices.

6. In a machine of the class described, means for comparing data on a record card with settable data, comprising manually settable switches, means for emitting a series of differentially timed impulses, a circuit completed by each of said switches under control of a record card, and means controlled by said circuits for controlling the operation of the machine.

CLAIR D. LAKE.